May 9, 1939.                G. W. SCHATZMAN                 2,157,921
                           FENDER SKIRT MOUNTING
                           Filed Feb. 26, 1938            2 Sheets-Sheet 1
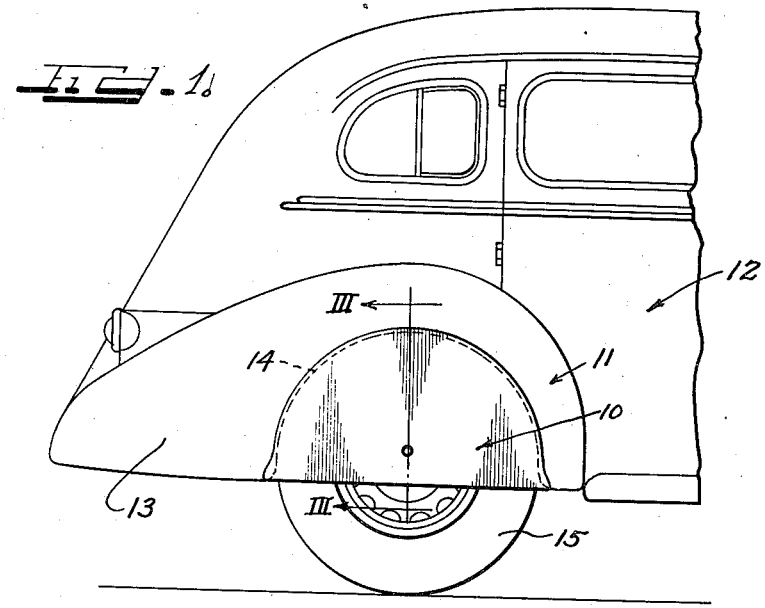
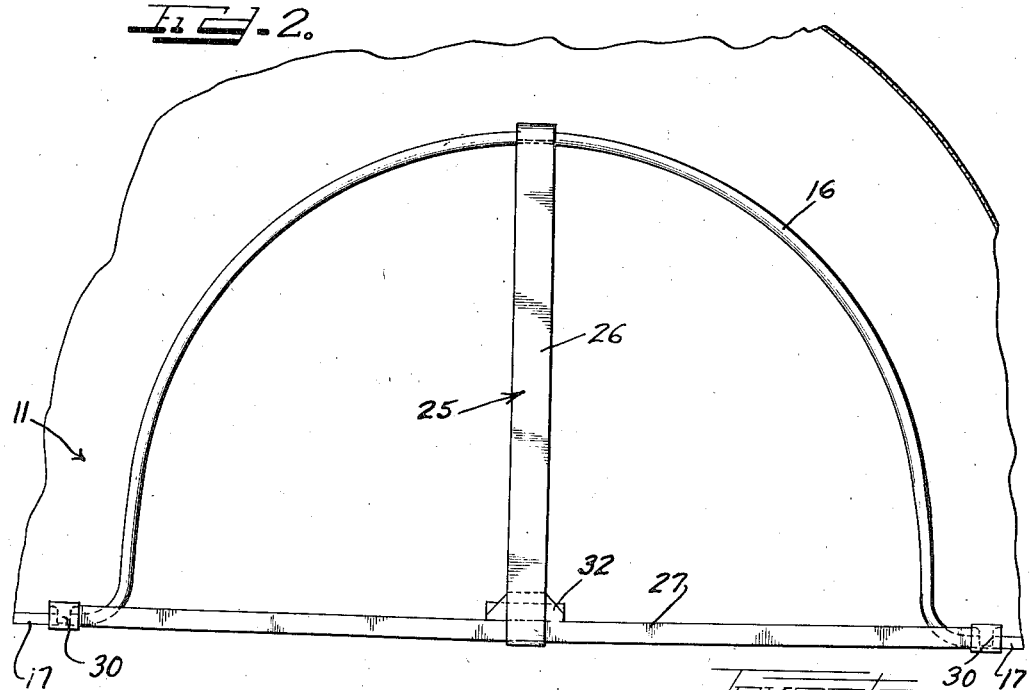
George W. Schatzman.

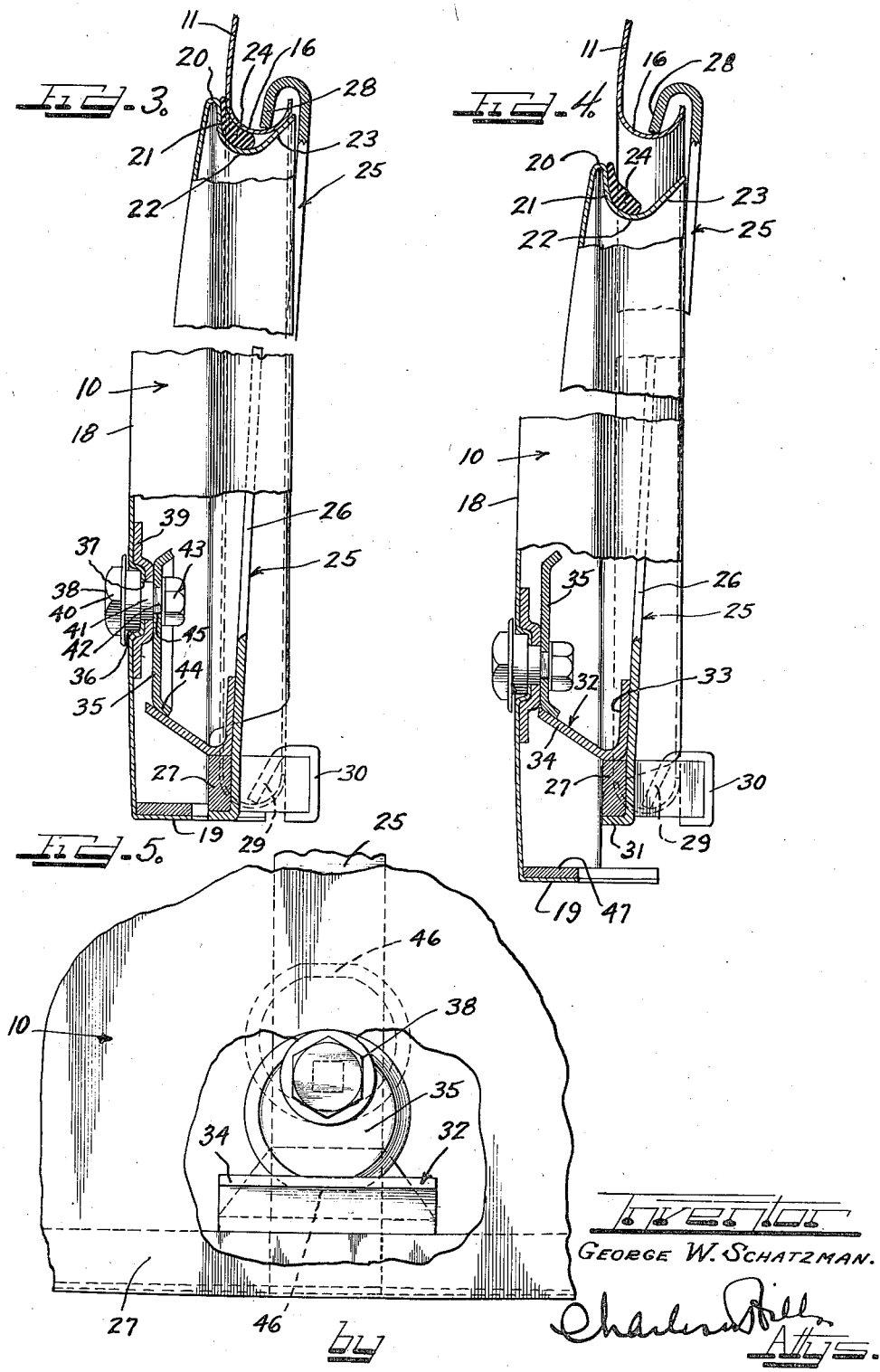

Patented May 9, 1939

2,157,921

UNITED STATES PATENT OFFICE 2,157,921

FENDER SKIRT MOUNTING

George W. Schatzman, Detroit, Mich., assignor, by mesne assignments, to Houdaille-Hershey Corporation, Detroit, Mich., a corporation of Michigan Application February 26, 1938, Serial No. 192,731

8 Claims. (Cl. 292—241)

This invention relates to ornamental fender skirts, and more particularly to a novel means for securing an ornamental fender skirt to a vehicle fender.

In designing ornamental fender skirts of shields of the type which are adapted to cover the usual wheel access opening in a vehicle fender, it is important that the means which is employed to secure the fender skirt in desired position be simple and quick to operate both in the assembly of the fender skirt on the vehicle fender and in removing it therefrom. It also must possess the desired degree of ruggedness when in use and be substantially free from vibration and noise. In further view of the fact that ornamental fender skirts are frequently damaged or partially damaged by minor collisions and other accidents, it is desirable to provide a fender skirt mounting mechanism which is separate from the fender skirt proper in order that the fender skirt proper may be replaced when damaged without replacing the mounting mechanism itself. In view of the fact that ornamental fender skirts are usually sold as accessories, this mounting mechanism must also be separate from the vehicle fender or the car body itself.

It is an object of this invention to provide a novel ornamental fender skirt and fender skirt mounting which possesses the above highly desirable characteristics.

Another object of this invention is to provide an improved fender skirt and fender skirt mounting which is economical to manufacture and which is rugged and reliable in use.

A further object of this invention is to provide novel means for supporting the fender skirt and for urging the fender skirt upwardly in the plane of the fender opening.

Another and further object of this invention is to provide a novel mounting and clamping mechanism for holding a fender skirt in tight engagement with the opening defining edge of a vehicle fender, and to provide novel operating mechanism for rendering the clamping mechanism effective.

Another and still further object of this invention is to provide a novel fender skirt mounting adapted to be suspended from the underturned opening defining edge of a vehicle fender and which engages a rotatable eccentrically mounted cam to support the fender skirt in desired position.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a side elevational view of the rear part of an automobile having the usual form of vehicle fender and equipped with an ornamental fender skirt constructed in accordance with the teachings of the present invention;

Figure 2 is a rear elevational view of the vehicle fender and fender skirt mounting, with the fender skirt removed;

Figure 3 is a side elevational view partly in cross section of the fender skirt and fender skirt mounting taken along the lines III—III of Figure 1;

Figure 4 is a side elevational view similar to Figure 3 but showing the mounting mechanism in a position with the fender skirt partially disengaged from the fender of the vehicle;

Figure 5 is an enlarged fragmentary front view of the cam mechanism of the fender skirt which cooperates with the fender skirt mounting to support the fender skirt in desired position.

In Figure 1 of the drawings, I have illustrated a fender skirt 10 constructed in accordance with the teachings of the present invention assembled on a rear fender 11 of an automobile 12. The fender 11 is shown as being of the high crown type having a downwardly extending outer side wall portion 13, the latter being provided with the usual opening 14 which affords access to the vehicle wheel 15 and which permits ready removal of the wheel 15 in an axial direction. The fender skirt 10 is disposed over the opening 14 in such a manner as to substantially close the opening and to harmonize with the outer side wall portion 13 of the fender 11. The outer surface of the fender skirt 10 may, of course, be substantially smooth, as is illustrated in the drawings or it may assume any other desired configuration for the purpose of ornamentation.

As shown in Figure 2, the outer marginal edge of the fender 11 which defines the opening 14 is underturned as at 16, while the outer marginal edges that define the base of the fender 11 are underturned as at 17. As is well known to those skilled in the art, fenders of the high crown type are generally provided with these underturned edge portions to increase the rigidity of the fender. As will presently be explained, advantage is taken of this feature to assemble and secure the ornamental fender skirt over the fender opening.

Referring now to Figures 2 to 5 inclusive of the drawings, the mounting and clamping mechanism by which the fender skirt 10 is detachably secured to the vehicle fender 11 will be described.

The fender skirt 10 includes a principal part or panel 18 which extends entirely across the wheel opening 14 and slightly overlaps the marginal edge of the vehicle fender 11. This panel portion 18 terminates in a substantially straight lower edge portion 19 which is bent at substantially a right angle to the panel portion 18 and extends rearwardly as is clearly shown in Figures 3 and 4 of the drawings. The curved edge portion 20 of the panel 18 of fender skirt 10 is formed by bending a portion of the material of the fender skirt 10 back on itself as at 21, then rearwardly as at 22, and finally obliquely upwardly as at 23. Portions 21, 22, and 23, as will readily be seen from an inspection of Figures 3 and 4 of the drawings, form an outwardly opening channel which is adapted to be seated on the underturned opening defining edge 16 of fender 11. In order to prevent rattling or other noises resulting from a direct metal to metal contact, a cushioning strip 24 may be secured in the channel formed by portions 21, 22, and 23 so as to remain interposed between the fender skirt 10 and the fender 11 when the former is in desired assembled position. As will at once be appreciated by those skilled in the art, when the channel 21, 22, and 23 of fender skirt 10 is seated on the underturned edge 16 of fender 11, lateral movement of the curved edge of the fender skirt 10 is prevented. If some means is now provided for urging the fender skirt 10 upwardly in the plane of the fender opening, it is obvious that the fender skirt 10 will be firmly and securely held in place.

A detachable T-shaped frame or hanger 25, which is entirely separate from the fender skirt 10 as well as from the fender 11, provides the novel mounting means of the present invention by which the fender skirt 10 is vertically supported and held with its channel shape curved edge firmly seated on the underturned edge 16 of fender 11. The T-shaped frame or hanger 25 is disposed in an inverted position and comprises an upright or leg portion 26 and a horizontal or cross arm portion 27. The upright or leg portion 26 of frame 25 is curled over to form a hook 28 at its upper end which is arranged to extend into engagement with the underturned marginal edge 16 of fender 11 approximately at the top of the opening 14. The horizontal or cross arm 27 is of such length as to extend slightly beyond either side of the lower edge of opening 14 and is provided with a hook portion 29 at either end which is arranged to extend into engagement with the underturned lower edges 17 of fender 11. The hook 29 at each end of the cross arm 27 is preferably provided by welding or otherwise suitably securing a separate piece of metal 30 to the ends of the cross arm 27, as may be seen best in Figures 2, 3, and 4 of the drawings.

In order that the hook arm 29 of the frame 25 may be firmly seated in the underturned lower edges 17 of fender 11 at the same time that the hook arm 28 is seated in the under turned edge 16 at the top of opening 14, the vertical distance between the extremity of the hook arm 28 and the lower extremity of the hook arm 29 is preferably arranged to correspond with the vertical distance between the uppermost point of the opening 14 and the base edges 17 of fender 11. It is also to be observed that the T-shaped frame may be composed of a plurality of parts or may be composed and formed from a single piece of metal as would readily be apparent to those skilled in the art. As shown in the drawings, the upright or leg portion 26 is formed of a separate piece of material than that which forms the cross arm 27. The leg 26 is preferably formed to extend down across the cross arm 27 and is then curled thereunder as at 31. The leg 26 may be secured to the cross arm 27 in any desired manner such as by spot welding, riveting, or the like.

The T-shaped frame member 25 in general and in the manner in which it detachably engages the fender 11 has been described. The novel method and means by which this T-shaped frame member engages and supports the fender skirt 10 will now be set forth. Secured to the upright leg 26 of the T-shaped frame 25 approximately at the junction point of the leg 26 with the cross arm 27 is a cam engaging member 32 of substantially V-shape cross section. The cam engaging member 32 is composed of two legs 33 and 34 as may be seen best in Figures 3 and 4 of the drawings. The leg portion 33 is spot welded or otherwise suitably secured to the upright 26 of the frame 25. The leg portion 34 extends obliquely forwardly and upwardly to form a lip which engages a cam member 35 mounted on the fender skirt 10. As will presently be understood, the fender skirt 10 is vertically supported by engagement with the lip 34 of the member 32 carried on the inverted T-shaped frame 25. (See Fig. 2.)

The cam mechanism by which the fender skirt 10 is detachably supported by the T-shaped frame 25 will now be described.

At a central point in the lower portion of panel 18 of fender skirt 10 a recess 36 is formed and is apertured as at 37 for the reception of a stud bolt 38. This recessed portion 36 of the panel 18 is preferably reinforced by a collar member 39 welded or otherwise suitably secured thereover on the rear side of the fender skirt 10. The stud bolt 38 is provided with a head 40 which is adapted to be engaged by a lug wrench or other suitable tool, a cylindrical bearing portion 41 which rotatably supports the stud bolt 38 in the aperture 37, a cam supporting portion 42 of square cross sectional configuration, and a threaded inner end upon which is mounted a suitable fastening nut 43 for retaining the cam member securely in position on stud bolt 38.

The cam 35 is of generally disk shape but has an edge portion 44 which is bent obliquely rearwardly and outwardly for abutting cooperation with the lip 34 of member 32 of frame 25. The cam 35 is provided with an eccentrically disposed aperture 45 for complementary engagement with the portion 42 of stud bolt 38. By virtue of the fact that the aperture 45 is of square cross sectional configuration, it will readily be apparent to those skilled in the art that rotation of the stud bolt 38 effects a rotation of the cam 35.

Cam 38 is so arranged with respect to the member 32 of frame 25 that it engages it in the manner shown in Figures 3 and 4 of the drawings. Since the frame member 25 is vertically suspended from the fender 11, it will be clear that the engagement of the cam 35 with the member 32 of the frame member 25 will effect a supporting engagement of the fender skirt 10 on the frame member 25. It is further to be understood that when the cam member 35 is in the position shown in Figure 3 of the drawings, the fender skirt 10 will be pressed tightly upwardly against the underturned edge 16 of fender 11, but that when the cam member is in the position shown in Figure 4, the fender skirt 10 has been dropped a sufficient extent to permit disengagement of the seating engagement between the channel portion 21—22—23 from the underturned edge 16 of fender 11. In this position, it should be noted that the fender skirt is still vertically supported by virtue of the engagement of the cam 35 with the frame 25. The fender skirt 10 in this position, however, may be readily lifted off of the frame member by lifting it outwardly and slightly upwardly therefrom.

In order to prevent rotation of the cam 35 out of its position as shown in Figure 3 of the drawings, the cam 35 is preferably flattened as at 46. Due to the inherent resiliency of the cushioning member 24 and of the metal in the member 32 of the frame member 25, the cam 35 can only be rotated out of the position shown in Figure 3 by the positive application of a rotational force to the stud bolt 38.

The lower edge of fender skirt 10 may be reinforced if desired by welding or otherwise suitably securing a reinforcing bar 47 to the lower inturned edge 19 of the fender skirt 10.

The manner in which the fender skirt 10 is mounted on the fender 11 will now be described. The inverted T-shaped frame member 25 is hooked over the underturned edges 16 and 17 of the fender 11. The cam 35 of the fender skirt 10 is rotated to a position, such as that shown in Figure 4, and the fender skirt 10 is lifted into the opening 14 of the fender 11 with the cam 35 extending over the lip 34 of the frame member 25. The cam 35 of the fender skirt 10 is then rotated by turning the stud bolt 38 with a lug wrench or other suitable tool. As the cam 35 rotates the obliquely bent outer edge 34 of the cam 35 rides against the lip 34 causing an upward movement of the fender skirt 10. The curved edge of the fender skirt 10 during this movement moves upwardly so as to seat the channel shape portion thereof on the underturned edge 16 of the fender 11. From a careful inspection of Figures 3 and 4 of the drawings, it will be observed that this is readily accomplished by virtue of the fact that the rear edge of the portion 23 of fender skirt 11 rides upwardly on the upright arm 26 of the frame member 25. This, of course, is not necessary in order to carry out the teachings of the present invention, for a channel shape edge of the fender skirt 10 may be guided in any other suitable manner into seating engagement with the underturned edge 16 of fender 11. As the rotation of the cam 35 continues the fender skirt is pressed into firm and tight engagement with the underturned edge 16, and finally the flattened edge 46 of the cam 35 snaps into seating engagement on the lip 34 of the frame member 25.

To dismount the fender skirt 10 from fender 11, the cam 35 is rotated from the position shown in Figure 3 to the position shown in Figure 4. As the cam 35 rotates out of its position as shown in Figure 3, the fender skirt 10 drops out of engagement with the underturned edge 16 by virtue of its own weight. After the cam member 35 has been rotated substantially 180° from the position shown in Figure 3 to the position shown in Figure 4, the fender skirt 10 may be readily lifted out of the fender opening 14. Thereafter the frame member 25 is lifted off of the fender 11, and the disassembling operation is completed.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A fender skirt mounting for detachably supporting a fender skirt in desired position on a vehicle fender over the wheel opening thereof, comprising an independent hanger loosely hung on said fender, said hanger including a supporting member upon which said skirt may rest, and a movable cam member on said skirt arranged to bear against said supporting member for effecting translational movement of said skirt with respect to said hanger, thereby to tightly clamp said skirt and said hanger on said fender.

2. A fender skirt mounting for detachably supporting a fender skirt in desired position on a vehicle fender over the wheel opening thereof, comprising an independent hanger having a three point suspension and being loosely hung on said fender, said hanger including a supporting member upon which said skirt may rest, and a movable cam member on said skirt arranged to bear against said supporting member for moving said skirt upwardly into tight engagement with said vehicle fender.

3. A fender skirt mounting for detachably supporting a fender skirt in desired position on a vehicle fender over the wheel opening thereof, comprising an independent inverted T-shaped hanger loosely hung on said fender, the cross arm of the T extending across the lower edge of said fender skirt and the leg of the T extending upwardly behind said skirt into supporting engagement with said fender, and means on said fender skirt for engaging said hanger to be supported thereby.

4. A fender skirt mounting for detachably supporting a fender skirt in desired position on a vehicle fender over the wheel opening thereof, comprising an independent mounting member shaped to hook onto said fender and be suspended therefrom, said member having an obliquely upwardly and forwardly extending lip, and said skirt having a rotatable and eccentrically mounted disk arranged to bear against the upper surface of said lip, said disk and said lip cooperating to urge said mounting member downwardly and said skirt upwardly into tight engagement with said fender.

5. A fender skirt mounting for detachably supporting a fender skirt in desired position on a vehicle fender over the wheel opening thereof, including an independent inverted T-shaped member, the cross arm of which extends across the lower part of the opening into detachable supporting engagement with said fender and the upright leg of which extends upwardly within the opening into detachable supporting engagement with an upper part of said fender, and means on said skirt for supporting said skirt on said T-shaped member and for urging said skirt upwardly into tight engagement with said fender.

6. A fender skirt mounting for detachably supporting a fender skirt in desired position on a vehicle fender over the wheel opening thereof, comprising an independent hanger loosely hung on said fender, said hanger including an obliquely upwardly extending supporting flange upon which said skirt may be supported, and a cam member rotatably mounted on said skirt and arranged to bear against said supporting flange of said hanger, said cam being shaped and arranged to force said skirt upwardly into tight engagement with said fender for partial rotation thereof.

7. A fender skirt mounting for detachably supporting a fender skirt in desired position on a vehicle fender over the wheel opening thereof, comprising an independent hanger loosely hung on said fender, said hanger including an obliquely upwardly extending supporting flange upon which said skirt may be supported, and a cam member rotatably mounted on said skirt and arranged to bear against said supporting flange of said hanger, said cam being in the form of an eccentrically mounted disk having its outer edge bent obliquely outwardly and complementary to said supporting flange of said hanger, whereby said cam causes upward movement of said fender skirt into tight engagement with said fender upon partial rotation thereof.

8. A fender skirt mounting for detachably supporting a fender skirt in desired position on a vehicle fender over the wheel opening thereof, comprising an independent hanger loosely hung on said fender, said hanger including an obliquely upwardly extending supporting flange upon which said skirt may be supported, and a cam member rotatably mounted on said skirt and arranged to bear against said supporting flange of said hanger, said cam being in the form of an eccentrically mounted disk arranged to have its outer edge bear against said supporting flange of said hanger, a portion of the edge of said disk which is substantially a maximum distance away from the point of rotation of said disk being flattened, whereby said cam is normally arranged to have said flattened portion of the edge of said disk bear against said supporting flange of said hanger.

GEORGE W. SCHATZMAN.